UNITED STATES PATENT OFFICE.

GEORGE A. FREAR, OF CHICAGO, ILLINOIS.

IMPROVEMENT IN THE MANUFACTURE OF ARTIFICIAL STONE, STUCCO, CEMENT, &c.

Specification forming part of Letters Patent No. 73,965, dated February 4, 1868.

*To all whom it may concern:*

Be it known that I, GEORGE A. FREAR, of Chicago, in the county of Cook and State of Illinois, have invented a new and useful Improvement in the Production of Artificial Stones and Marbles, and of Stucco, Cements, and Mineral Paints; and I do hereby declare the following to be a full and exact description thereof.

The nature of my invention consists in the use of an aqueous solution of gum-shellac, or its equivalent, in cementing together particles of silex, alumina, calcium, or other mineral substances, to produce, artificially, a hard and durable stone, stucco, cement, or paint, for useful or ornamental purposes.

My shellac solution is best obtained by boiling the gum-shellac of commerce in water previously made alkaline by the addition of any suitable alkaline salt in proper proportion. The proportions of shellac, alkali, and water may, and necessarily will, vary with the strength and quality of the solution required in producing various descriptions of stones, cements, &c.

In the manufacture of artificial stones for building purposes, I use a solution obtained by first dissolving from two to four ounces of saleratus, potash, soda, or other equivalent alkali, in about one gallon of pure boiling water, and then adding thereto one pound of gum-shellac, boiling the mixture until the gum is entirely dissolved.

A firm and durable stone, impervious to moisture, is produced by dampening a mixture of about one part of lime or cement and four parts of sand or other silicious material (with or without gravel or other ingredients) with my aqueous solution of shellac, and then firmly compressing the composition into molds of any desired form, either by suitable machinery or by hand with mallets or tamping-rods.

The blocks or other articles thus produced will rapidly harden when removed from the molds, and in a few days are ready for building purposes. I prefer to obtain the compression of the material by percussion rather than by simple pressure.

To produce a more perfect finish, I contemplate washing the surface or face of the artificial stone thus manufactured, five or six days after molding the same, with a weak solution of shellac dissolved in alcohol, ether, or spirits of turpentine, (say about one pound of shellac in one gallon of the spirits.)

Instead of using a mixture of lime or cement and sand to produce an artificial stone, I contemplate moistening simple sand, clay, lime, chalk, or other earthy or mineral substance, as well as any combinations thereof, with my aqueous shellac solution, and then molding the same by percussion into suitable blocks or other devices, so that endless variety may be obtained therein at pleasure.

To produce a mastic or stucco, I add so much of my shellac solution to lime, sand, clay, or any earthy or silicious material, or to mixtures thereof, as that the material or mixture shall be reduced by the solution to a pasty consistency which can be readily worked and applied with a trowel. If then applied to any suitable surface, it will firmly adhere thereto, and, upon hardening, produce a firm, waterproof surface, which may be made to resemble stone so closely as not to be readily distinguished therefrom. By making the composition still thinner, it may be used as a substitute for paint, and it will also form a strong and adhesive cement for stone-work, &c.

Through a proper choice of the sand or other substances forming the basis of my improved artificial stones, &c., or by the use of coloring matter in connection therewith, nearly all descriptions of natural stone may be imitated and any colors or shades of material obtained at pleasure.

In applying my improved stucco or mastic to buildings, whether of brick or stone, I first wash the surface with my aqueous shellac solution preparatory to laying on the composition hereinbefore described.

Having thus fully described my invention, I claim therein as new and desire to secure by Letters Patent—

The use of an aqueous solution of shellac in the production of artificial stones, cements, stucco, &c., for useful and ornamental purposes.

GEO. A. FREAR.

In presence of—
DAVID A. BURR,
H. H. YOUNG.